US009565261B2

(12) United States Patent
Babaian et al.

(10) Patent No.: US 9,565,261 B2
(45) Date of Patent: Feb. 7, 2017

(54) LOCATION INFORMATION IN A COMMUNICATIONS SYSTEM

(75) Inventors: Aram Nicholas Babaian, London (GB); Veiko Raime, Tartu (EE); Mark McLaughlin, Surrey (GB)

(73) Assignee: Skype, Dublin (IE)

( * ) Notice: Subject to any disclaimer, the term of this patent is extended or adjusted under 35 U.S.C. 154(b) by 449 days.

(21) Appl. No.: 12/455,705

(22) Filed: Jun. 5, 2009

(65) Prior Publication Data

US 2010/0122183 A1    May 13, 2010

(30) Foreign Application Priority Data

Nov. 7, 2008    (GB) .................................. 0820447.1

(51) Int. Cl.
*G06F 3/00*    (2006.01)
*H04L 29/08*    (2006.01)
(Continued)

(52) U.S. Cl.
CPC ............... *H04L 67/22* (2013.01); *H04L 67/18* (2013.01); *H04L 67/24* (2013.01); *H04W 4/02* (2013.01)

(58) Field of Classification Search
USPC ................ 715/752, 748; 340/581; 455/456.1
See application file for complete search history.

(56) References Cited

U.S. PATENT DOCUMENTS 6,442,394 B1 * 8/2002 Valentine et al. ......... 455/456.3
7,197,295 B2 * 3/2007 Otsuka et al. ............. 455/404.2
(Continued)

FOREIGN PATENT DOCUMENTS

| WO | WO 2004/104789 A2 | 12/2004 |
|---|---|---|
| WO | WO 2005/009019 A2 | 1/2005 |
| WO | WO 2007/063499 A1 | 6/2007 |

OTHER PUBLICATIONS

International Search Report from PCT/EP2009/063560, 5 pp., mailed Mar. 11, 2010.
(Continued)

*Primary Examiner* — Toan Vu
(74) *Attorney, Agent, or Firm* — Tom Wong; Micky Minhas

(57) ABSTRACT

A method of communicating location information relating to a first user of a first communication client from a first user terminal over a communications system to a second user terminal, the first user terminal executing the first communication client and the second user terminal executing a second communication client, the method comprising: the second communication client displaying a list of contacts associated with a second user of the second communication client, the list of contacts comprising a first contact representing the first user; the first user terminal determining a location of the first user; the first user terminal storing the determined location in a store of the first user terminal; the first communication client reading the stored location from the store; the first communication client generating a message comprising a visual indication of the location read from the store; transmitting the message from the first user terminal to the second user terminal; and displaying the visual indication of the location on the second user terminal in the contact list in association with the first contact.

20 Claims, 6 Drawing Sheets

(51) Int. Cl.
  *H04W 4/02*   (2009.01)
  *G06F 3/01*   (2006.01)

(56) References Cited

U.S. PATENT DOCUMENTS

| | | | |
|---|---|---|---|
| 7,433,682 B1* | 10/2008 | Moll et al. | 455/414.1 |
| 7,698,228 B2* | 4/2010 | Gailey et al. | 705/64 |
| 7,801,542 B1* | 9/2010 | Stewart | 455/518 |
| 2001/0010499 A1* | 8/2001 | Hopkins | 340/825.49 |
| 2003/0144008 A1* | 7/2003 | Rehkopf | 455/456 |
| 2004/0006425 A1* | 1/2004 | Wood et al. | 701/208 |
| 2004/0127229 A1* | 7/2004 | Ishii | 455/456.1 |
| 2005/0038876 A1* | 2/2005 | Chaudhuri | 709/219 |
| 2005/0050143 A1* | 3/2005 | Gusler et al. | 709/206 |
| 2005/0075116 A1* | 4/2005 | Laird et al. | 455/456.3 |
| 2006/0075091 A1* | 4/2006 | Beyda et al. | 709/224 |
| 2006/0223494 A1* | 10/2006 | Chmaytelli et al. | 455/404.2 |
| 2006/0258368 A1* | 11/2006 | Granito et al. | 455/456.1 |
| 2006/0270419 A1* | 11/2006 | Crowley et al. | 455/456.2 |
| 2007/0027921 A1* | 2/2007 | Alvarado et al. | 707/104.1 |
| 2007/0072583 A1* | 3/2007 | Barbeau et al. | 455/404.2 |
| 2007/0168446 A1* | 7/2007 | Keohane et al. | 709/207 |
| 2007/0189737 A1* | 8/2007 | Chaudhri et al. | 386/125 |
| 2007/0200713 A1* | 8/2007 | Weber et al. | 340/573.1 |
| 2007/0225017 A1* | 9/2007 | Li et al. | 455/456.1 |
| 2007/0229549 A1* | 10/2007 | Dicke et al. | 345/676 |
| 2007/0237096 A1* | 10/2007 | Vengroff et al. | 370/254 |
| 2007/0281716 A1* | 12/2007 | Altman et al. | 455/466 |
| 2008/0040419 A1* | 2/2008 | Muth | 709/203 |
| 2008/0082620 A1* | 4/2008 | Barsness | 709/207 |
| 2008/0102802 A1* | 5/2008 | Do et al. | 455/414.2 |
| 2008/0133580 A1 | 6/2008 | Wanless et al. | |
| 2008/0162632 A1* | 7/2008 | O'Sullivan et al. | 709/204 |
| 2008/0233935 A1* | 9/2008 | Garg | 455/417 |
| 2008/0254811 A1 | 10/2008 | Stewart | |
| 2009/0005076 A1* | 1/2009 | Forstall et al. | 455/456.2 |
| 2009/0013048 A1* | 1/2009 | Partaker | G06Q 10/107 709/206 |
| 2009/0013059 A1* | 1/2009 | Partaker et al. | 709/217 |
| 2009/0017840 A1* | 1/2009 | Camp et al. | 455/456.3 |
| 2009/0017870 A1* | 1/2009 | An | 455/565 |
| 2009/0098888 A1* | 4/2009 | Yoon | 455/456.2 |
| 2009/0191840 A1* | 7/2009 | Piett et al. | 455/404.1 |
| 2009/0191898 A1* | 7/2009 | Lewis et al. | 455/456.3 |
| 2009/0240564 A1* | 9/2009 | Boerries et al. | 705/10 |
| 2009/0258656 A1* | 10/2009 | Wang et al. | 455/456.1 |
| 2009/0258674 A1* | 10/2009 | Groth | 455/556.1 |
| 2010/0064007 A1* | 3/2010 | Randall | 709/204 |
| 2010/0105439 A1* | 4/2010 | Friedman et al. | 455/566 |
| 2010/0110105 A1* | 5/2010 | Kinnunen et al. | 345/629 |
| 2011/0137813 A1* | 6/2011 | Stewart | G06Q 50/01 705/319 |
| 2012/0015673 A1* | 1/2012 | Klassen et al. | 455/456.3 |
| 2012/0220266 A1* | 8/2012 | Lau et al. | 455/411 |

OTHER PUBLICATIONS

Written Opinion of the International Searching Authority from PCT/EP2009/063560, 7 pp., mailed Mar. 11, 2010.

\* cited by examiner

LOCATION INFORMATION IN A COMMUNICATIONS SYSTEM

RELATED APPLICATION

This application claims priority under 35 U.S.C. §119 or 365 to Great Britain Application No. 0820447.1, filed Nov. 7, 2008. The entire teachings of the above application are incorporated herein by reference.

This invention relates to location information in a communications system.

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), voicemail and file transfer.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

One of the advantages of packet-based communication systems, compared to the public switched telephone network ("PSTN"), is that presence information can be provided for the users. Presence information is a user-defined indication of the current status of the user of the system. Presence information is displayed in the user interface of the client for each of the contacts that the user has stored, and allows the user to view the current user-defined status of the contacts in the system. Example presence states that may be displayed include "online", "offline", "away", and "do not disturb".

The use of presence states provides a user with a best-guess regarding the current state of a contact before attempting to communicate with the contact. For example, if the user's presence state indicates the user is not online, and therefore unable to be contacted, then this is indicated to the user before attempting to make a call. Similarly, if a contact is busy and unlikely to answer, then this may also be communicated in advance via the contact's presence state (by the contact setting the appropriate presence state). This is a considerable advantage over PSTN systems, which do not provide any prior information on the probable state of a user. The only option in PSTN systems is to dial a number and wait and see if it is answered.

Presence information in VoIP communication systems can be supplemented by "mood messages". Mood messages are short text strings that are composed by the users to distribute information about themselves to their contacts. A Mood message may comprise an identifier to identify the message as a mood message. Mood messages supplement the presence status of the users. The mood message of a contact is generally displayed next to the contact's name and presence status in the client. Mood messages are useful for a number of reasons. For example, a mood message can be used to give more information or a reason for a particular presence status, e.g. if a user is offline, the mood message may say "On holiday", thereby explaining why the user is offline. Similarly, if a user's presence state is set to "do not disturb", the mood message may say "Busy working. Only contact me if urgent". Mood messages are also useful for users that travel frequently, as a VoIP system can be accessed from anywhere in the world, but this is not reflected in the presence states. Therefore, it is useful for a user to show a mood message such as "In London" next to their presence state. In this way the user can communicate his location to other users of the VoIP system using a mood message.

Known mood messages need to be short and text-based due to the network overhead that is required to transmit the mood message data to a potentially very large number of users of the VoIP system, and also because of space constraints in the user interface of the client for the display of the mood message.

A problem with mood messages is that they must be set by the user of the packet-based communication system. In order for the mood messages to accurately reflect the status of the user, the user must remember to regularly update his mood message. Frequently, the user can forget to do this, leading to inaccurate or inappropriate mood messages being displayed to a user's contacts. In particular, this is a problem when the mood messages are used to communicate the user's location to his contacts. In the modern world people travel frequently and the location shown in a mood message can quickly become an inaccurate representation of the location of the user.

There is therefore a need for a technique to address the aforementioned problems with mood messages.

According to a first aspect of the invention there is provided a method of communicating location information relating to a first user terminal from the first user terminal over a communications system to a second user terminal, the first user terminal executing a first communication client and the second user terminal executing a second communication client, the method comprising:
  the second communication client displaying a list of contacts associated with a second user of the second communication client, the list of contacts comprising a first contact representing a first user of the first communication client;
  the first user terminal determining a location of the first user terminal;
  the first user terminal storing the determined location in a store of the first user terminal;
  the first communication client reading the stored location from the store;

the first communication client generating a message comprising a visual indication of the location read from the store;

transmitting the message from the first user terminal to the second user terminal; and displaying the visual indication of the location on the second user terminal in the contact list in association with the first contact.

According to a second aspect of the invention there is provided a communications system for communicating location information comprising:

a first user terminal executing a first communication client, said first user terminal configured to:

determine a location of the first user terminal; and store the determined location in a store of the first user terminal, said first communication client being configured to read the stored location from the store, generate a message comprising a visual indication of the location read from the store; and transmit the message; and a second user terminal executing a second communication client, said second communication client configured to:

display a list of contacts associated with a second user of the second communication client, the list of contacts comprising a first contact representing a first user of the first communication client;

receive the message transmitted by the first communication client; and display the visual indication of the location in the contact list in association with the first contact.

In a third aspect of the invention there is provided a user terminal for transmitting location information relating to the user terminal over a communications system to a further user terminal, the user terminal executing a communication client, the user terminal configured to:

determine a location of the user terminal; and store the determined location in a store of the user terminal, said communication client being configured to:

read the stored location from the store, generate a message comprising an identifier and a visual indication of the location read from the store, and transmit the message to the further user terminal, wherein the identifier identifies the message such that the visual indication of the location will be displayed in a contact list on the further user terminal in association with a contact in the contact list, the contact representing a user of the communication client.

In a fourth aspect of the invention there is provided a method for transmitting location information relating to a user terminal from the user terminal over a communications system to a further user terminal, the user terminal executing a communication client, the method comprising:

the first user terminal determining a location of the user terminal;

the first user terminal storing the determined location in a store of the user terminal;

the first communication client reading the stored location from the store;

the first communication client generating a message comprising an identifier and a visual indication of the location read from the store; and the first communication client transmitting the message to the further user terminal, wherein the identifier identifies the message such that the visual indication will be displayed in a contact list on the further user terminal in association with a contact in the contact list, the contact representing a user of the communication client.

According to the invention in another aspect, there is provided a computer readable medium comprising computer readable instructions for performing the method of the invention as herein described, in particular the invention in the fourth aspect above.

According to the invention in another aspect, there is provided a method of communicating location information relating to a first user terminal from the first user terminal over a communications system to a second user terminal, the first user terminal executing a first communication client and the second user terminal executing a second communication client, the method comprising:

the second communication client displaying a list of contacts associated with a second user of the second communication client, the list of contacts comprising a first contact representing a first user of the first communication client;

the first user terminal determining a location of the first user terminal;

the first user terminal storing the determined location in a store of the first user terminal;

the first communication client reading the stored location from the store;

the first communication client generating a message comprising a visual indication of the location read from the store;

transmitting the message from the first user terminal to the second user terminal; and displaying the visual indication of the location on the second user terminal in the contact list in association with the first contact.

For a better understanding of the present invention and to show how the same may be put into effect, reference will now be made, by way of example, to the following drawings in which.

Figure 1:
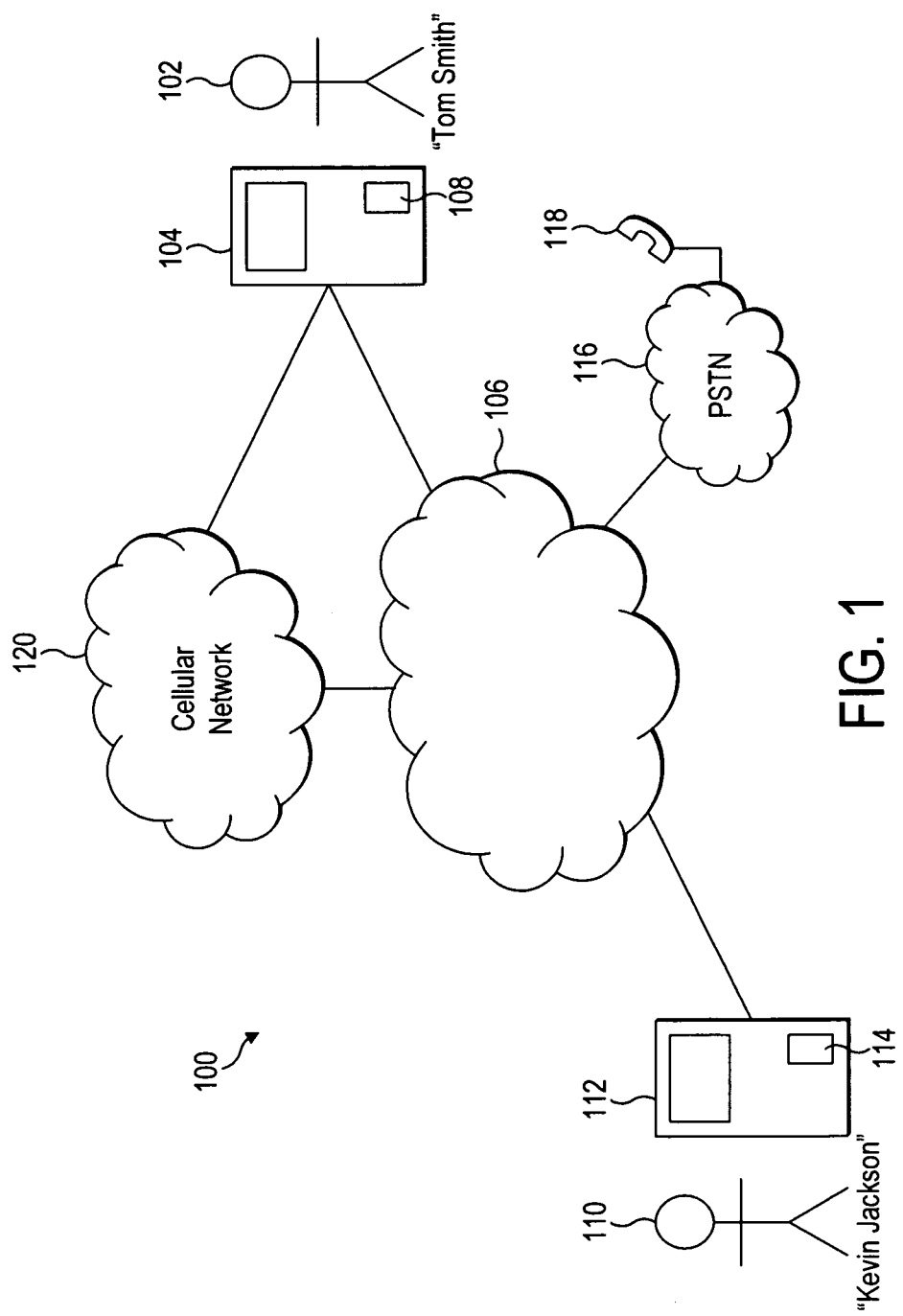
FIG. 1 shows a packet-based communication system.

Reference is first made to FIG. 1, which illustrates a packet-based communication system 100. Note that whilst this illustrative embodiment is described with reference to a P2P communication system, other types of communication system could also be used, such as non-P2P, VoIP or IM systems. A first user of the communication system (named "Tom Smith" 102) operates a user terminal 104, which is shown connected to a network 106. Note that the communication system 100 utilises a network such as the Internet. The user terminal 104 may be, for example, a mobile phone, a personal digital assistant ("PDA"), a personal computer ("PC") (including, for example, Windows™, Mac OS™ and Linux™ PCs), a gaming device or other embedded device able to connect to the network 106. The user device 104 is arranged to receive information from and output information to a user 102 of the device. In a preferred embodiment of the invention the user device comprises a display such as a screen and an input device such as a keypad, joystick, touch-screen, keyboard and/or mouse. The user device 104 is connected to the network 106.

Note that in alternative embodiments, the user terminal 104 can connect to the communication network 106 via additional intermediate networks not shown in FIG. 1. For example, if the user terminal 104 is a mobile device, then it can connect to the communication network 106 via a cellular mobile network 120 (for example a GSM or UMTS network).

The user terminal 104 is running a communication client 108, provided by the software provider. The communication client 108 is a software program executed on a local processor in the user terminal 104.

Figure 2:
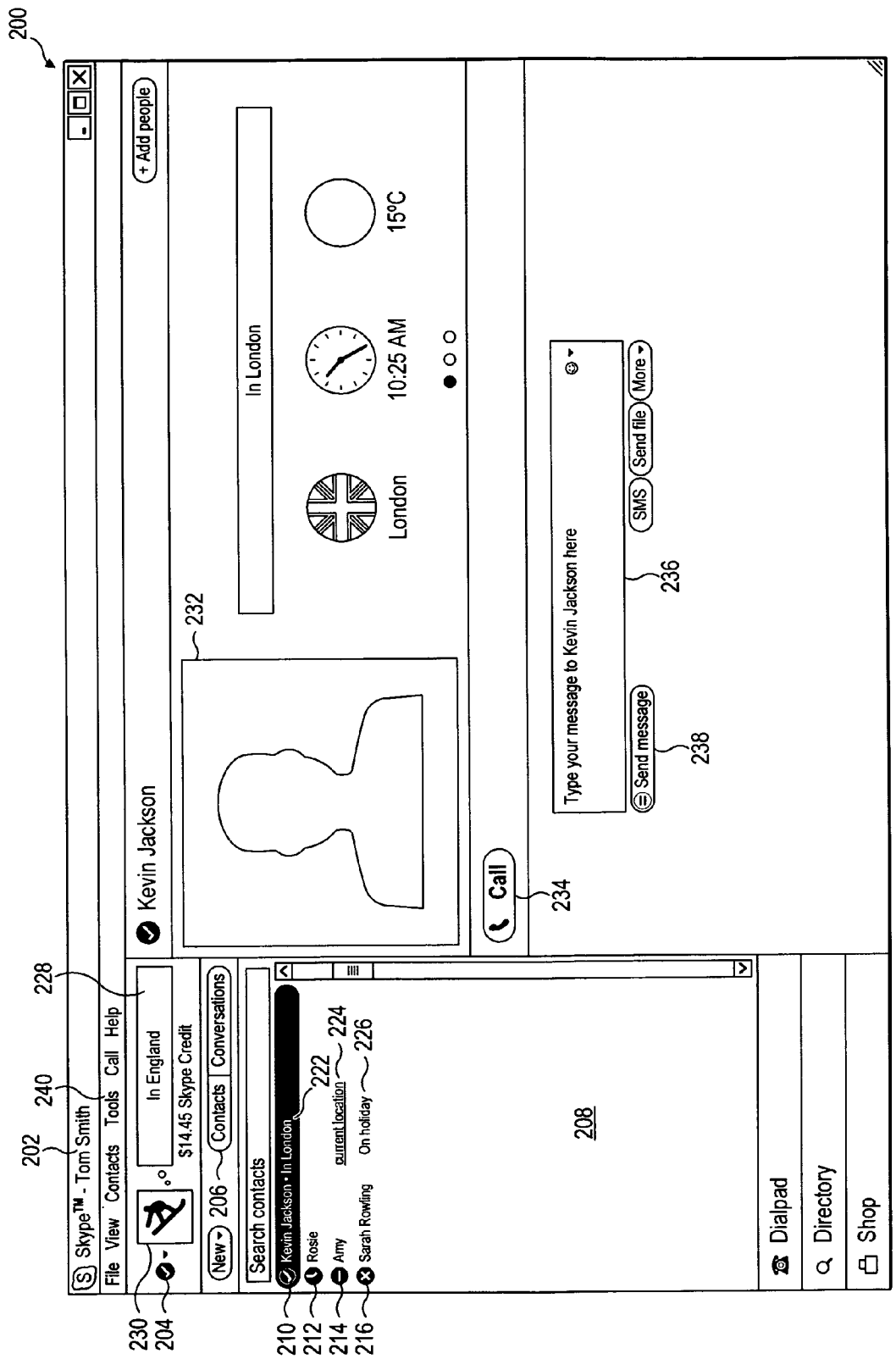
FIG. 2 shows a first user interface of a communication client.

An example of a user interface 200 of the communication client 108 executed on the user terminal 104 of the first user 102 is shown illustrated in FIG. 2. Note that the user interface 200 can be different depending on the type of user terminal 104. For example, the user interface can be smaller or display information differently on a mobile device, due to the small screen size. In the example of FIG. 2, the client user interface 200 displays the username 202 of "Tom Smith" 102 in the communication system, and the user can set his own presence state (that will be seen by other users) using a drop down list by selecting icon 204.

The client user interface 200 comprises a button 206 labelled "contacts", and when this button is selected the contacts stored by the user in a contact list are displayed in a pane below the button 206. In the example user interface in FIG. 2, four contacts of other users of the communication system are shown listed in contact list 208. Each of these contacts have authorised the user 102 of the client 108 to view their contact details and presence state. Each contact in the contact list has a presence status icon associated with it. For example, the presence status icon for "Kevin Jackson" 210 indicates that this contact is "online", the presence icon for "Rosie" 212 indicates that this contact is "away", the presence icon for "Amy" 214 indicates that this contact's state is "do not disturb" ("DND"), the presence icon for "Sarah Rowling" 216 indicates that this contact is "offline". Further presence state indications can also be included.

Presence information in packet-based communication systems can additionally be supplemented by "mood messages". Mood messages are traditionally short text strings that are composed by the users to distribute information about themselves to their contacts to supplement their presence status. Mood messages can therefore be considered to be extended presence information. Mood messages act as a supplementary data channel between a user and all of his contacts for the simple distribution of information. The mood message of a contact is generally displayed next to the contact's name in the list of contacts 208. The presence status of the contact is displayed with the mood message next to the name of the contact in the list of contacts 208.

Mood messages are useful for a number of reasons. For example, a mood message can be used to give more information or a reason for a particular presence status, e.g. if a user is offline, the mood message may say "On holiday", thereby explaining why the user is offline. Similarly, if a user's presence state is set to "do not disturb", the mood message may say "Busy working. Only contact me if urgent". In FIG. 2, the mood messages 222, 224 and 226 of the contacts are shown displayed next to the names of the contacts in the contact list 208.

The contacts in the contact list for a user (e.g. "Tom Smith") are stored in a contact server (not shown in FIG. 1). When the client 108 first logs into the communication system the contact server is contacted, and the contacts in the contact list are downloaded to the user terminal 104. This allows the user to log into the communication system from any terminal and still access the same contact list. The contact server is also used to store the user's own mood message (e.g. a mood message 228 of the first user 102) and a picture 230 selected to represent the user (known as an avatar). This information can be downloaded to the client 108, and allows this information to be consistent for the user when logging on from different terminals. The client 108 also periodically communicates with the contact server in order to obtain any changes to the information on the contacts in the contact list, or to update the stored contact list with any new contacts that have been added.

Presence state information is not stored centrally in the contact server. Rather, the client 108 periodically requests the presence state information for each of the contacts in the contact list 208 directly over the communication system. Similarly, the current mood message (e.g. "in London" 222 for "Kevin Jackson") for each of the contacts, as well as a picture (avatar—e.g. picture 232 for "Kevin Jackson") that has been chosen to represent the contact, are also retrieved by the client 108 directly from the respective clients of each of the contacts over the communication system. The presence states and mood messages of the contacts are therefore determined using a "pull" technique, as the data is requested from the clients of each of the contacts. In alternative embodiments, the presence state, mood message and avatar of a user can be "pushed" to each of the user's contacts over the communication network, either periodically or whenever the presence state is changed.

VoIP calls to the users in the contact list may be initiated over the communication system by selecting the contact and clicking on a "call" button 234 using a pointing device such as a joystick or a mouse. Referring again to FIG. 1, the call set-up is performed using proprietary protocols, and the route over the network 106 between the calling user and called user is determined by the peer-to-peer system without the use of servers. For example, the first user "Tom Smith" 102 can call a second user "Kevin Jackson" 110.

Following authentication through the presentation of digital certificates (to prove that the users are genuine subscribers of the communication system—described in more detail in WO 2005/009019), the call can be made using VoIP. The client 108 performs the encoding and decoding of VoIP packets. VoIP packets from the user terminal 104 are transmitted into the network 106, and routed to a user terminal 112 of the called party 110. A client 114 (similar to the client 108) running on the user terminal 112 of the called user 110 decodes the VoIP packets to produce an audio signal that can be heard by the called user through a speaker of user terminal 112. Conversely, when the second user 110 talks into a microphone of the user terminal 112, the client 114 executed on user terminal 112 encodes the audio signals into VoIP packets and transmits them across the network 106 to the user terminal 104. The client 108 executed on user terminal 104 decodes the VoIP packets, and produces an audio signal that can be heard by the user of the user terminal 104 through a speaker of the user terminal 104.

The VoIP packets for calls between users (such as 102 and 110) as described above are passed across the network 106 only, and the public switched telephone network ("PSTN") 116 is not involved. Furthermore, due to the P2P nature of the system, the actual voice calls between users of the communication system can be made with no central servers being used. This has the advantages that the network scales easily and maintains a high voice quality, and the call can be made free to the users. Additionally, calls can also be made from the client (108, 114) using the packet-based communication system to fixed-line or mobile telephones 118, by routing the call to the PSTN network 116. Similarly, calls from fixed-line or mobile telephones 118 can be made to the packet-based communication system via the PSTN 116.

In addition to making voice calls, the user of the client 108 can also communicate with the users listed in the contact list 208 in several other ways. For example, an instant message (also known as a chat message) can be sent by typing a message in box 236 (as shown in FIG. 2) and sending it by selecting the "send message" button 238. Additionally, the first user 102 can use the client 108 to transmit files to users in the contact list 208, send voicemails to the contacts or establish video calls with the contacts (not illustrated in FIG. 2).

Figure 3:
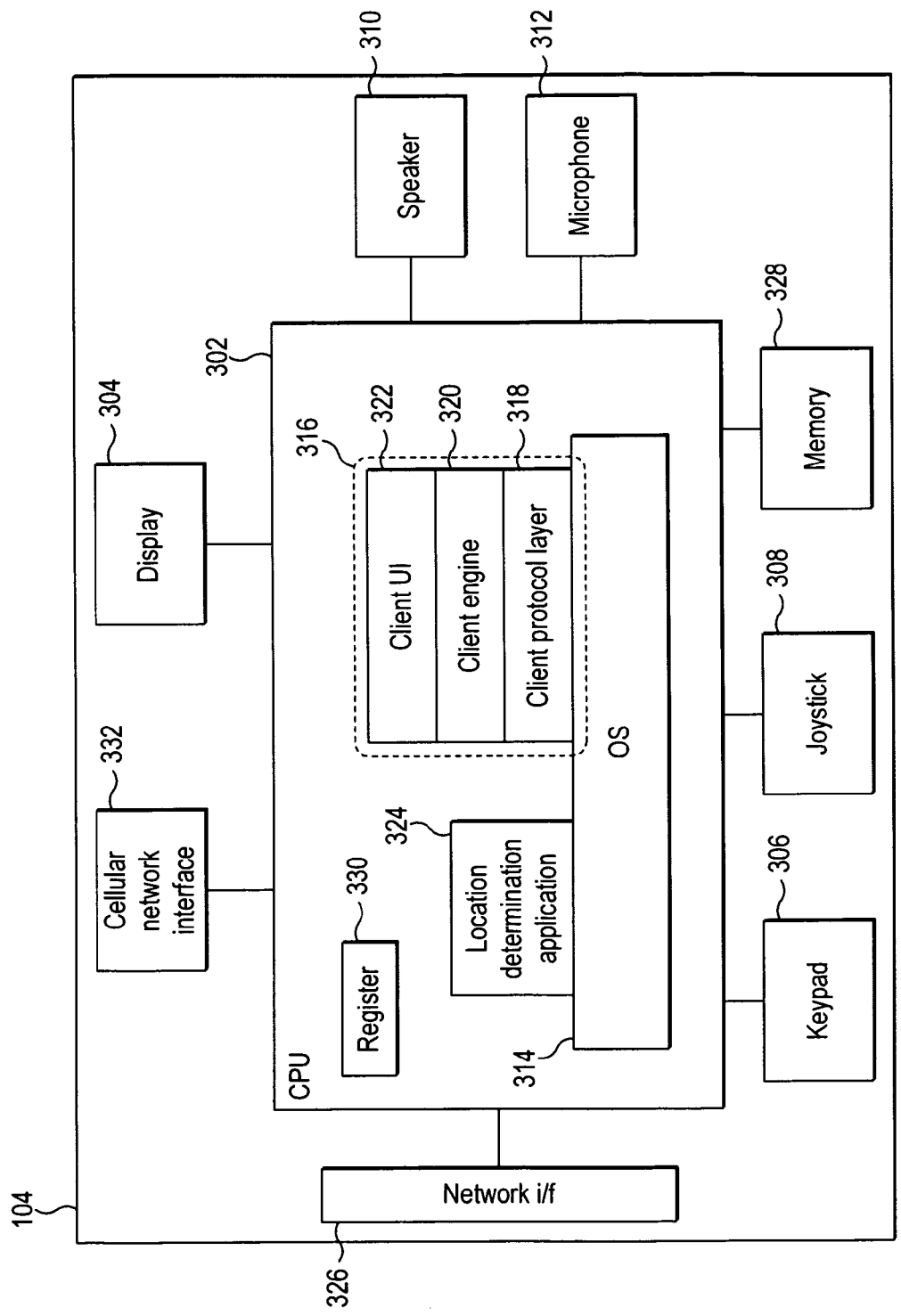
FIG. 3 shows a user terminal executing a communication client.

FIG. 3 illustrates a detailed view of the user terminal 104 on which is executed client 108. The user terminal 104 comprises a central processing unit ("CPU") 302, to which is connected a display 304 such as a screen, input devices such as a keypad (or a keyboard) 306 and a pointing device such as a joystick 308. The display 304 may comprise a touch screen for inputting data to the CPU 302. An output audio device 310 (e.g. a speaker) and an input audio device 312 (e.g. a microphone) are connected to the CPU 302. The display 304, keypad 306, joystick 308, output audio device 310 and input audio device 312 are integrated into the user terminal 104. In alternative user terminals one or more of the display 304, the keypad 306, the joystick 308, the output audio device 310 and the input audio device 312 may not be integrated into the user terminal 104 and may be connected to the CPU 302 via respective interfaces. One example of such an interface is a USB interface. A pointing device such as a mouse (not shown) may be connected to the CPU 302 via an interface (not shown). The CPU 302 is connected to a network interface 326 such as a modem for communication with the network 106. The network interface 326 may be integrated into the user terminal 104 as shown in FIG. 3. In alternative user terminals the network interface 326 is not integrated into the user terminal 104.

FIG. 3 also illustrates an operating system ("OS") 314 executed on the CPU 302. Running on top of the OS 314 is a software stack 316 for the client 108. The software stack shows a client protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 326. The client protocol layer 318 of the client software communicates with the operating system 314 and manages the connections over the communication system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

Location determination applications may be used on user terminals to determine the location of the user terminal. Location determination applications can be used in fixed user terminals such as a PC but are more often used in mobile user terminals, such as mobile phones or satellite navigation systems. The location determination application 324 determines the location of the user terminal 104 and the determined location may be displayed to the user on the display 304. The determined location may also be stored in a memory 328 of the user terminal 104. The memory 328 may be a permanent memory, such as ROM. The memory 328 may alternatively be a temporary memory, such as RAM. The determined location may also be stored in a register 330 of the CPU 302.

In a preferred embodiment the location determination application 324 uses a Global Positioning System to determine the location of the user terminal 104, and therefore the location of the user 102. The use of a Global Positioning System to determine the location of a user terminal is well known in the art and is not explained in further detail herein.

In an alternative embodiment the user terminal 104 has an Internet Protocol (IP) address which is used for communicating over the network 106. The location determination application 324 uses the IP address to determine the location of the user terminal 104, and therefore the location of the user 102. The determination of the location using an IP address is well known to those skilled in the art and is not described here in further detail.

In another alternative embodiment the user terminal 104 is in communication with cellular network 120 (shown in FIG. 1) through cellular network interface 332. Cellular network interface 332 may comprise a transceiver integrated into the user terminal 104. Cellular network 120 may be a cellular mobile communication network. Cellular network 120 may implement a Global System for Mobile communications (GSM) standard, or a Universal Mobile Telecommunications System (UMTS) standard, or any other standard for communicating between base stations of the cellular network and user terminals in the cellular network. The location of a base station in a cellular network is a parameter that is known in the network 120. The user terminal 104 may use information regarding which base station(s) it is communicating with and the location of this base station(s) to determine a location of the user terminal 104, and therefore a location of the user 102. The location determined in this way may cover a geographical region of one of the cells of the cellular network 120.

The embodiments described above are examples of methods for determining the location of the user terminal 104. Other well known methods may be used for the user terminal to determine its location.

Figure 4:
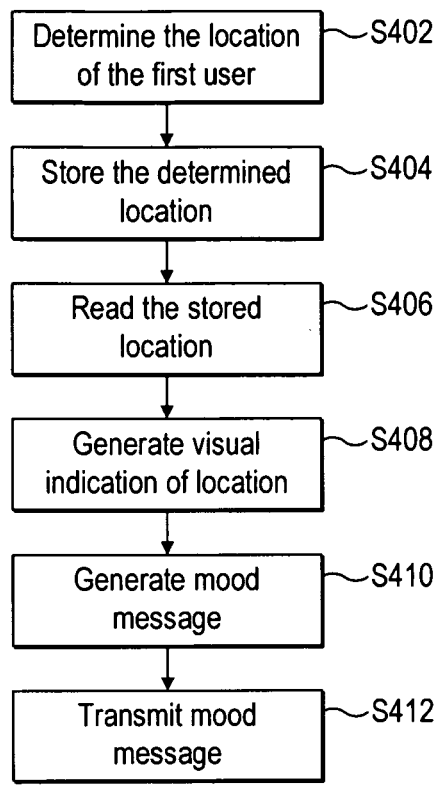
FIG. 4 shows a flowchart of a process for automatically generating a mood message comprising a visual indication of the location of the user terminal.

Reference is now made to FIG. 4, which shows a flow chart of the method performed at the user terminal 104. In step S402 the location determination application 324 determines the location of the user terminal 104. The location may be determined in a number of ways as described above. The location is determined by the user terminal 104 independently from any instructions from the user 102 of the user terminal 104. In other words, the user terminal 104 automatically determines its location. In this way, the user terminal 104 generates location information relating to its location.

In step S404 the determined location is stored at the user terminal 104. The determined location may be stored in a memory 328 of the user terminal, such as RAM or ROM as described above. Alternatively, the determined location may be stored in the CPU 302 of the user terminal 104, for example in a register 330 of the CPU.

In step S406 the communication client 108 reads the stored location from the place in which it was stored in step S404, for example from the memory 328 or the register 330.

In step S408 the communication client 108 generates a visual indication of the location. The visual indication may be humanly readable text, such as a word or a phrase, that describes the location of the user terminal 104. The visual indication may be a map showing the location of the user terminal 104. The visual indication may be a link to a map showing the location of the user terminal 104. In the case of the visual indication being a link to a map, when the link is activated, for example when a user clicks on the link, a map showing the location of the user terminal is retrieved. The map may be retrieved from a store internal to the user terminal 104, or from a store external to the user terminal 104, for example from a server of the network 106. The map that is retrieved can be displayed to the user 102 of the user terminal 104. In other embodiments, the visual indication of the location can be any indication that is visible to a user that describes the location of the user terminal 104. Other such suitable visual indications would be known to the skilled person and further examples are not described herein.

In step S410 the user terminal 104 generates a mood message comprising the visual indication. In other words, the user terminal 104 includes the visual indication of the determined location in the mood message. As described above, the mood message is used to supplement the presence status of the user 102. The user terminal 104 automatically generates the mood message comprising the visual indication. This means that the user terminal is able to include the visual indication of the determined location of the user terminal 104 in a mood message independently from any instructions from the user 102 of the user terminal 104. In this way the user terminal 104 embeds the visual indication in a mood message. The mood message may comprise an identifier to identify the message as a mood message.

In step S412 the mood message comprising the visual indication of the location of the user terminal 104 is transmitted from the user terminal 104. User 110 may be authorised to receive the mood messages of user 102. In this case, the mood message may be transmitted to user terminal 112 which is associated with user 110. The mood message may be transmitted with the presence status of the user 102. As described above, the mood message may be 'pulled' by the second user terminal 112, or the mood message may be 'pushed' to the second user terminal 112 by the user terminal 104. The transmission of the mood messages occurs automatically, without any actions being required from the user 102 of the user terminal 104. This ensures that even during periods in which the user is not able to update his mood message, or when it would be inappropriate for the user to update his mood message, the mood message is kept up to date automatically by the user terminal 104. The mood messages are transmitted repeatedly from the user terminal 104. The mood messages may be transmitted at regular intervals, such as for example once every second or once every minute.

Steps S402 through to S410 described above may occur without any intervention from the user 102 of the user terminal 104. This allows the location of the user terminal 104 to be determined and a visual indication of the location to be included in a mood message without any input being required from the user 102. The steps S402 through to S410 may occur repeatedly and may occur at regular intervals, such as once every second or once every minute for example. This ensures that the indication of the location of the user terminal in the user's mood message is up to date.

Updating the mood message in this way ensures that contacts who can view the mood message of the user 102 are given an accurate indication of the location of the user terminal, and therefore an accurate indication of the location of the user.

Figure 5:
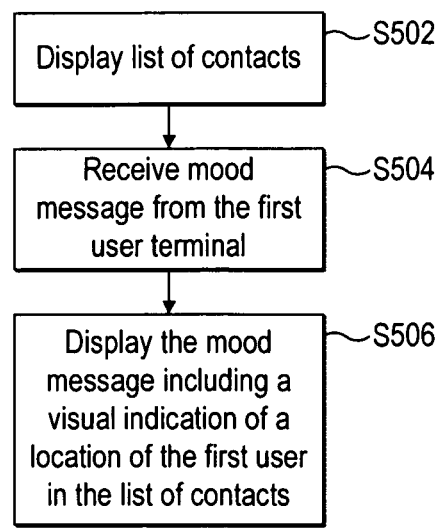
FIG. 5 shows a flowchart of a process for receiving and displaying a mood message.

User terminal 112 is capable of generating and transmitting mood messages that comprise a visual indication of the location of user terminal 112 to the user terminal 104, in the same way that user terminal 104 can generate and transmit such mood messages to user terminal 112 as described above. Referring now to FIG. 5, there is shown a flow chart of the steps that are performed at the user terminal 104 when it receives such a mood message from the user terminal 112.

As described above in relation to FIG. 2, in step S502 the client 108 uses the display 304 of the user terminal 104 to display a list of contacts 208 of the user 102 "Tom Smith". In the list of contacts 208 the presence status and mood message of the respective contacts is shown. For example the presence icon 210 of contact "Kevin Jackson" indicates that he is "online". The mood message 222 of Kevin Jackson indicates that he is "in London". The presence icon 212 of the contact called "Rosie" indicates that she is "away". Rosie does not have a mood message. The presence icon 214 of contact "Amy" indicates "do not disturb". The mood message 224 of Amy is a link to a map. The activation of a link to a map in a mood message is described in more detail below. The presence icon 216 of contact "Sarah Rowling" indicates that she is "offline". The mood message 226 of Sarah Rowling indicates that she is "On holiday".

In step S504 the user terminal 104 receives a mood message relating to user 110 from the user terminal 112. As described above, the mood message may be received as a result of a 'push' from user terminal 112, or a 'pull' from user terminal 104. The mood message includes an identifier to identify the message as a mood message. In this way the user terminal 104 can identify the message as a mood message so that it knows that it should display the information contained in the mood message in the contact list 208, as described above, next to the name of the user 110.

In step S506 the mood message received from the user terminal 112 is displayed in the contact list next to the name of the user 110 of the user terminal 112.

Mood messages may be received from each of the contacts in the contact list 208, and when mood messages are received they are displayed next to the name of the relevant contact in the contact list. In this way the user (Tom Smith) of the user terminal 104 can view mood messages of all of his contacts. As shown in FIG. 2, the mood message of contact "Kevin Jackson" indicates that the contact is currently in London. When embodiments of the present invention are used, a location indicated in the mood message is kept up to date automatically as described above, and therefore the user of the user terminal 104 can rely on the information in the mood message to be an accurate indication of the location of the contact "Kevin Jackson". The location information embedded in the mood message can be used by the user of the user terminal 104 to decide whether to place a call to Kevin Jackson, or to communicate with Kevin Jackson in some other way, or not to communicate with Kevin Jackson at the current time.

In the example shown in FIG. 2, the mood message 222 indicates the location of the contact "Kevin Jackson" using humanly readable text. In particular the words "in London" are used to indicate the location of the contact.

Figure 6:
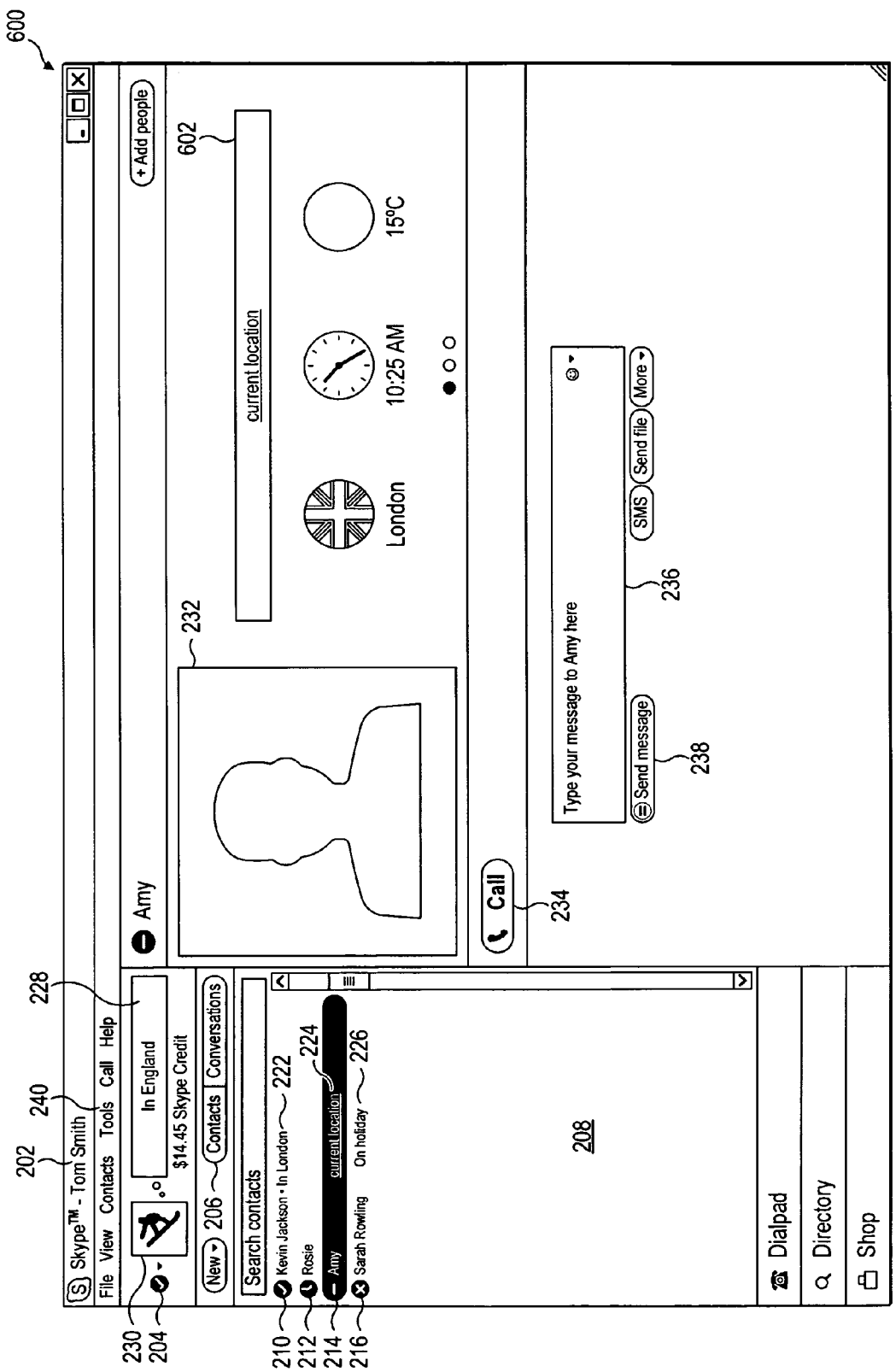
FIG. 6 shows a second user interface of a communication client.

FIG. 6 shows the situation where the contact called "Amy" has been selected in the contact list 209. The avatar 232 and the mood message 602 of the contact "Amy" are displayed as shown in FIG. 6. The mood message of contact "Amy" is displayed in the contact list 208 as mood message 224, and is displayed outside of the contact list 208 as mood message 602. The mood message of "Amy" is a link to a map. This is indicated by the underlining of the mood message. When the mood message (either 224 or 602) is activated, such as by the user 102 clicking on the link, a map of the location of the user terminal relating to the contact "Amy" is retrieved. The map may be retrieved from a store, such as for example a server on the network 106, or alternatively the map may be retrieved from the user terminal associated with the user "Amy".

Figure 7:
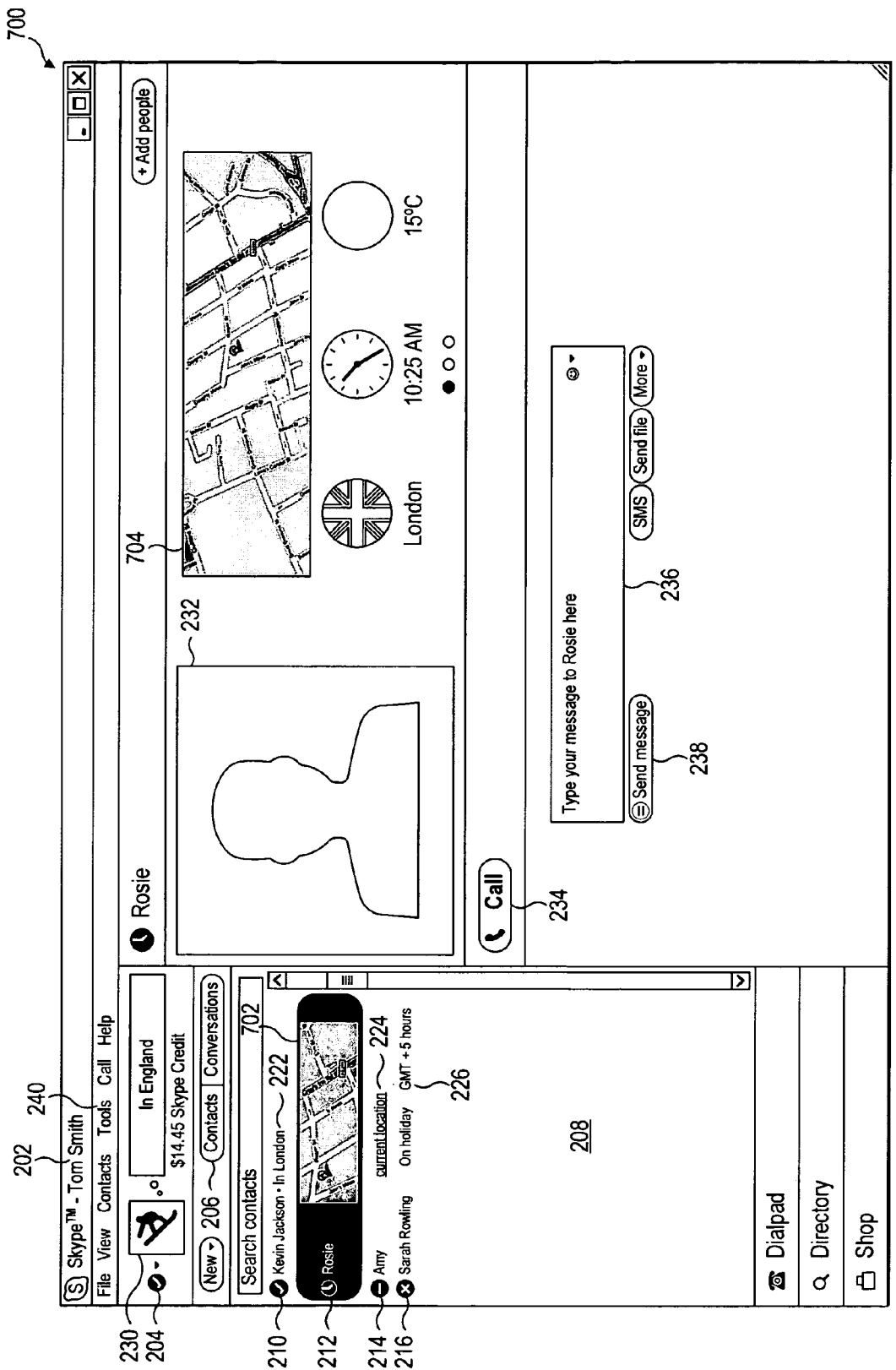
FIG. 7 shows a third user interface of a communication client.

In FIG. 7 the contact called "Rosie" has a mood message 702 which comprises a map of the location of the user terminal associated with the contact "Rosie". The map in the mood message is a visual indication of the location, which has been included in the mood message as described above in relation to FIG. 4. FIG. 7 shows the situation in which the contact "Rosie" has been selected in the contact list 208. The avatar 232 and the mood message 704 of the contact "Rosie" are displayed outside of the contact list 208 as shown in FIG. 7. The mood message 702 may show the whole map or it may show a portion of the map included in the mood message, the portion of the map being of a size suitable for display in the contact list 208 next to the name of the contact. The mood message 704 may show the whole of the map or a second portion of the map included in the mood message. Since the mood message 704 is not constrained by the size of the contact list 208, the second portion of the map shown in mood message 704 may show more of the map than the portion of the map shown in mood message 702.

In a communications system, such as the P2P communications system described above, a user can login on different user terminals. For example the user may login to a first user terminal, such as a fixed user terminal, e.g. a PC, in a first location, such as London. In this case the first user terminal may recognize a user and thus determine the location of the user and include a visual indication of the location in a mood message of the user. The user may then travel to a second location, such as Paris, and login to a second user terminal, which may also be a fixed user terminal. The second user terminal may similarly determine the location of the user and include a visual indication of the location in the mood message of the user. In this way, the location indicated in the mood message can change as the user logs into different user terminals. The location of the user is associated with the location of the user terminal to which he has logged in. It is therefore not necessary for the location of a user terminal to change, for the location indicated in the mood message to change, as the user may login to different user terminals.

Alternatively, where the user terminal 104 is a mobile user terminal associated with the user 102, the user may take the user terminal 104 with him as he travels. Therefore as the location of the mobile user terminal changes the location of the user also changes. A visual indication of the changing location of the mobile user terminal is included in a mood message of the user.

The determination of the location of the user terminal 104 may occur every time the user terminal is switched on. In an embodiment, steps S404 to S410 of FIG. 4 are only performed when the determined location changes. In this way a mood message is generated comprising the determined location of the user terminal 104 only when the location of the user terminal 104 changes. This prevents unnecessary generation of new mood messages when the location of the user terminal has not changed.

As shown in FIG. 2 the mood message 228 of Tom Smith is set to "in England". The mood message 222 of Kevin Jackson is set to "in London". The location indicated in the mood message can define a geographical region with a variable size. For example, the location indicated in the mood message may be a country, for example England. The location indicated in the mood message may alternatively be a city, e.g. London, or a street name, e.g. John Street, or a place of interest, e.g. Buckingham Palace. The indication of the location may include more than one indication defining geographical regions of different size, for example the mood message may say "in London, England".

The scale or range of the indicated location can change as described above. That is to say, the area covered by the location is variable as described above. When the user terminal is in a location that is not popularly known, for example if they are in Almondsbury in Bristol, it may be useful to increase the geographical region defined by the determined location. For example the indication of the location included in the mood message may be "Bristol" rather than "Almondsbury".

Where the indication of the location of the user is a map, the size of the geographical region defined by the location may be varied by varying the scale of the map. Similarly, where the indication of the location is a link to a map, the size of the geographical region defined by the location may be varied by varying the scale of the map that is retrieved when the link is activated.

The size of the geographical region of the location may be set by the user 102. Alternatively, the size of the geographical region of the location may be set by the user terminal 104.

The user 102 has a home location (e.g. Oxford Street, London) as part of a profile that is saved on a server on the network 106. The user terminal may set the size of the geographical region of the indicated location according to the distance between the determined location and the home location of the user 102. In this way, when the user is a long way from his home location, the determined location may be on a large scale (e.g. "Australia"). However, when the user is close to his home location, the determined location may be on a smaller scale (e.g. "Mayfair").

The mood message may comprise more than one visual indication of the location of the user terminal. The different indications may be of different types. For example the mood message may include a map of the location of the user terminal and also humanly readable text, such as a word or a phrase, to describe the location of the user terminal 104.

The mood message may comprise information, such as text, other than the visual indication of the location. The other information may be displayed in the contact list 208 on the user terminal 104 with the visual indication of the location of the user terminal next to the name of the contact.

The mood message may be transmitted to each contact in the user's list of contacts 208. In this way, the user transmits his mood message only to contacts that he has authorised to be in his contact list. In alternative embodiments, the mood message may be transmitted only to user terminals associated with contacts that have been authorised by the user 102 to receive the mood message comprising a visual indication of the location of the user terminal 104. In this way the security of the system is preserved so that only authorised users are able to view the mood message of the user including the location of the user. This is useful as the user may not want unauthorised users to be able to view his current location.

In some embodiments, as well as determining the location of the user terminal 104, a time zone associated with the user terminal is determined. This determined time zone can be stored in memory, read from memory by the communication client and included in a mood message similarly to the determined location, as described above in relation to FIG. 4. In this way, the time zone of a contact can be displayed in the mood message in the contact list 208 on the user terminal 104. This can be very useful for the user 102 of the user terminal 104 in deciding whether to initiate communication with a particular user. As shown in FIG. 7, mood message 226 of the contact "Sarah Rowling" shows that the user is in the time zone "GMT+5 hours". The user 102 viewing this mood message of the contact "Sarah Rowling" is aware of the time zone of the contact. The user 102 may for example decide not to initiate a call to the contact at 23:00 GMT with the knowledge that the time will be 04:00 for the called contact.

The time zone may be determined using the determined location. Alternatively, the time zone may be determined separately from the determined location. The time zone is determined by the user terminal 104, independently from any instructions from the user 102. The time zone is determined automatically by the user terminal 104. The time zone is included in the mood message automatically and without instructions from the user 102.

The system and methods described above allow a mood message to be generated for a user comprising a visual indication of the location of the user terminal 104 which has been determined by the user terminal. The time zone of the user terminal may also be included in the mood message. In this way, the user does not need to remember to update his location in his mood message, as the user terminal automatically updates the mood message with the correct current location. The mood message is updated at times when the user may not be able to manually update the mood message and at times when it would be inappropriate for the user to manually update the mood message.

While this invention has been particularly shown and described with reference to preferred embodiments, it will be understood to those skilled in the art that various changes in form and detail may be made without departing from the scope of the invention as defined by the appendant claims. For example, it will be appreciated that embodiments of the invention described herein can be employed in an IM system, a VoIP system, a video call system or any combination thereof. The user terminals (104, 112) on which the communication client is running can connect to the communication network 106 via intermediate networks (such as mobile networks, WLAN networks or corporate networks).

According to the invention in certain embodiments, there is provided a communications system as described herein having the following features.

The visual indication of the location may comprise humanly readable text.

The visual indication of the location may comprise a map.

The visual indication of the location may comprise a link to a map.

The first user terminal may be a fixed user terminal receiving login information from the first user.

The first user terminal may be a mobile user terminal associated with the first user.

The mobile user terminal may be in further communication with a cellular communication network, the mobile user terminal further configured to determine a cell of the cellular communication network which is serving the mobile user terminal, wherein the determination of the location may comprise using location information associated with the determined cell.

The determination of the location may comprise using a Global Positioning System.

The determination of the location may comprise using an Internet Protocol address of the first user terminal.

The first user terminal may be configured to repeat the steps of determining and storing, and the first communication client is configured to repeat the steps of reading, generating and transmitting.

The first user terminal may be configured to perform the step of storing, and the first communication client may be configured to perform the steps of reading and generating only when the determined location changes.

The location may define a geographical region of variable size.

The first user may set the size of the geographical region.

The first user terminal may be configured to set the size of the geographical region.

The size of the geographical region may be dependent upon the distance between the determined location and a home location of the first user.

The first user may be associated with a first list of contacts, the first communication client being configured to transmit the message to a respective second user terminal associated with each contact in the first list of contacts.

The communications system may comprise at least one further second user terminal, the first communication client being configured to transmit the message only to further second user terminals associated with further second users that have been authorised by the first user to receive the message.

The first user terminal may be configured to determine the time zone associated with the determined location and the first communication client is configured to include the determined time zone in the message.

The message may further comprise text other than the visual indication of the location, wherein second communication client is configured to display the text with the visual indication on the second user terminal in the contact list in association with the first contact.

The communications system may be a Peer-to Peer communications system.

The invention claimed is:

1. A method of receiving location information relating to a first user of a first communication client from a first user terminal over a communications system at a second user terminal, the first user terminal executing the first communication client configured to perform encoding and decoding of VoIP packets and the second user terminal executing a second communication client configured to perform encoding and decoding of VoIP packets, the method comprising:

displaying, by the second communication client, a list of contacts associated with a second user of the second communication client, the list of contacts comprising a first contact representing the first user;

receiving a mood message from the first user terminal at the second user terminal, the mood message comprising as part of the mood message both an identifier to identify the mood message as the mood message and a visual indication of a location of the first user that is configured for display from the mood message, the visual indication of the location determined at the first terminal and without interaction of the first user with the first terminal; and displaying the visual indication of the location, taken from the mood message, on the second user terminal in a mood message field of the contact list along with a name representing the first contact and a presence status of the first contact.

2. The method according to claim 1 wherein the visual indication of the location comprises humanly readable text.

3. The method according to claim 1 wherein the visual indication of the location comprises a map.

4. The method according to claim 1 wherein the visual indication of the location comprises a link to a map.

5. The method according to claim 1 wherein the first user terminal is a fixed user terminal configured to receive login information from the first user.

6. The method according to claim 1 wherein the first user terminal is a mobile user terminal associated with the first user.

7. The method according to claim 6 wherein the mobile user terminal is configured to communicate with a cellular communication network to determine a cell of the cellular communication network which is serving the mobile user terminal, and wherein the location of the first user is determined based at least in part on the location information associated with the determined cell.

8. The method according to claim 1 wherein the location of the first user is determined using a Global Positioning System.

9. The method according to claim 1 wherein the location of the first user is determined using an Internet Protocol address of the first user terminal.

10. The method according to claim 1 wherein the location defines a geographical region of variable size.

11. The method according to claim 10 wherein a size of the geographical region is set by the first user.

12. The method according to claim 10 wherein a size of the geographical region is set by the first user terminal.

13. The method according to claim 12 wherein the size of the geographical region is dependent upon a distance between the location of the first user determined at the first user terminal and a home location of the first user.

14. The method according to claim 1 wherein the mood message includes a time zone associated with the location of the first user determined at the first terminal.

15. The method according to claim 1 wherein the mood message further comprises text other than the visual indication of the location, wherein the text is displayed with the visual indication on the second user terminal in the contact list in association with the first contact.

16. The method according to claim 1 wherein the communications system is a Peer-to Peer communications system.

17. A communications system for communicating location information comprising:
a first user terminal configured to execute a first communication client configured to perform encoding and decoding of VoIP packets, said first user terminal configured to:
determine a location of a first user of the first communication client; and
store the location in a store of the first user terminal;
said first communication client configured to:
read the location from the store;
generate a mood message comprising an identifier to identify the mood message as the mood message and a visual indication of the location read from the store, the visual indication of the location that is included in the mood message being displayable from the mood message as it is included in the mood message and being generated automatically and independent of user interaction with the first user terminal; and
transmit the mood message to a second user terminal configured to execute a second communication client configured to perform encoding and decoding of VoIP packets, the transmitting the mood message effective to cause said second communication client to display the visual indication of the location from the mood message in a mood message field of a contact list along with a name representing the first user and a presence status of the first user, the contact list associated with a second user of the second communication client.

18. A user terminal for transmitting location information relating to a user of a communication client over a communications system to a further user terminal, the user terminal configured to execute the communication client, which is configured to perform encoding and decoding of VoIP packets, the user terminal configured to:
determine a location of the user; and
store the location in a store of the user terminal, said communication client being configured to:
read the location from the store,
generate a mood message that includes an identifier to identify the mood message as the mood message along with a visual indication of the location read from the store, the mood message configured to include a map of the location as the visual indication of the location,
transmit the mood message to the further user terminal effective to cause the further user terminal to display the visual indication of the location, as included in the mood message, in a mood message field of a contact list on the further user terminal along with a name representing the user and a presence status of the user, and
transmit an updated mood message to the further user terminal effective to cause the further user terminal to display an updated visual indication of an updated location of the user, the updated mood message transmitted automatically and independent of user interaction with the user terminal.

19. A method for transmitting location information relating to a user of a communication client from a user terminal over a communications system to a further user terminal, the user terminal executing the communication client, which is configured to perform encoding and decoding of VoIP packets, the method comprising:
the user terminal determining a location of the user;
the user terminal storing the location in a store of the user terminal;
the communication client reading the location from the store;
the communication client generating a mood message that includes as part of the mood message both:
an identifier to identify the mood message as the mood message; and
a visual indication of the location read from the store that is generated without user interaction for inclusion as part of the mood message; and
the communication client transmitting the mood message to the further user terminal,
wherein the identifier identifies the mood message as the mood message effective to cause the visual indication, as included in the mood message, to be displayed in a mood message field of a contact list on the further user terminal along with a name representing the user and a presence status of the user.

20. A method of communicating location information relating to a first user terminal from the first user terminal over a communications system to a second user terminal, the first user terminal executing a first communication client configured to perform encoding and decoding of VoIP packets and the second user terminal executing a second communication client configured to perform encoding and decoding of VoIP packets, the method comprising:

the first user terminal determining a location of the first user terminal;

the first user terminal storing the location in a store of the first user terminal;

the first communication client reading the location from the store;

the first communication client generating a mood message comprising an identifier to identify the mood message as the mood message and a visual indication of the location read from the store that is generated automatically by the first communication client independent of user interaction with the first user terminal, the mood message configured to include a map of the location as the visual indication of the location; and transmitting the mood message from the first user terminal to the second user terminal effective to cause display of the visual indication of the location, as included in the mood message, on the second user terminal along with a name representing the first user and a presence status of the first user, the contact list associated with a second user of the second communication client.

* * * * *